Figure 1:
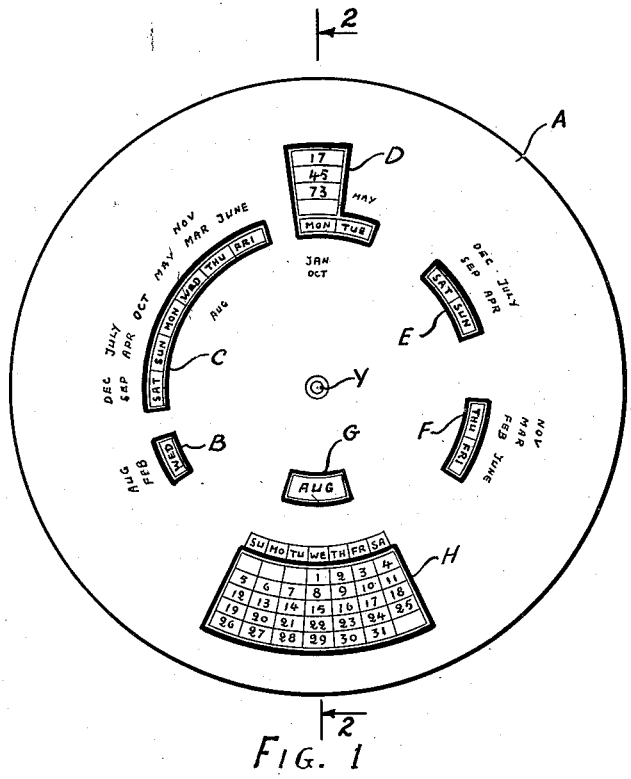

Dec. 5, 1950  S. Z. AVEDIKIAN ET AL  2,532,984
PERPETUAL CALENDAR

Filed April 20, 1948  3 Sheets-Sheet 1

INVENTORS
Souren Z. Avedikian
Dicran G. Avedikian
BY Emery, Varney,
Whittemore & Dix
ATTORNEYS Dec. 5, 1950  S. Z. AVEDIKIAN ET AL  2,532,984
PERPETUAL CALENDAR
Filed April 20, 1948  3 Sheets-Sheet 2
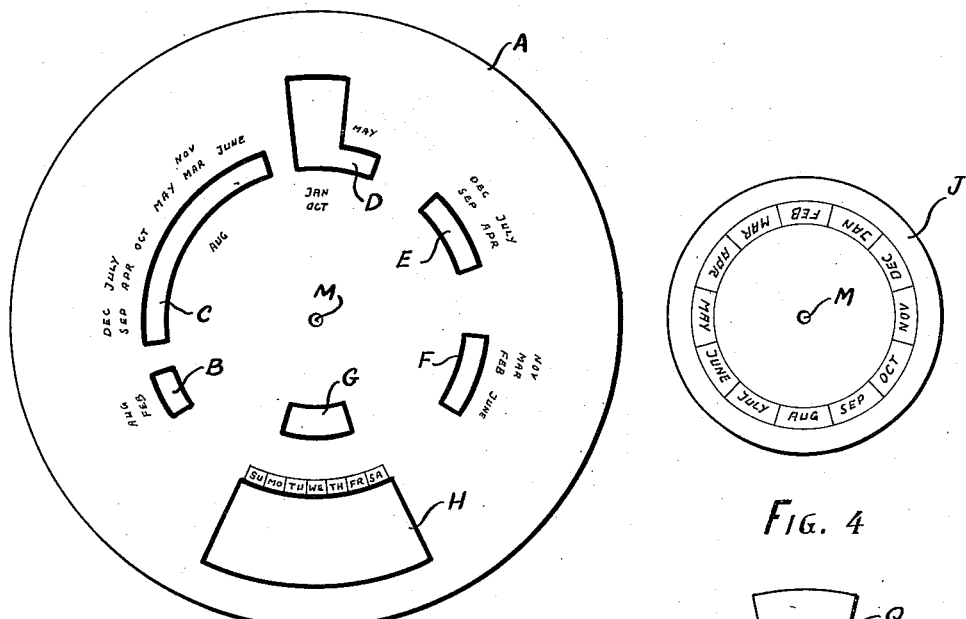
Fig. 3
Fig. 4
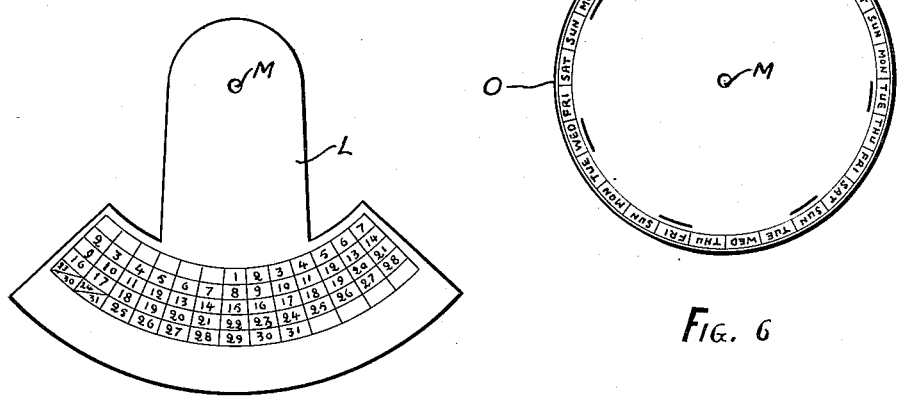
Fig. 5
Fig. 6
INVENTORS
Souren Z. Avedikian
Diran G. Avedikian
BY Emery, Varney,
Whittemore & Dix
ATTORNEYS Dec. 5, 1950  S. Z. AVEDIKIAN ET AL  2,532,984
PERPETUAL CALENDAR Filed April 20, 1948  3 Sheets-Sheet 3

INVENTORS
Souren Z. Avedikian
Dikran G. Avedikian
BY Emery, Varney,
Whittemore & Dix
ATTORNEYS Patented Dec. 5, 1950

2,532,984

UNITED STATES PATENT OFFICE 2,532,984

PERPETUAL CALENDAR

Souren Z. Avedikian and Diran G. Avedikian, Larchmont, N. Y., assignors to Tidings Corporation of America, Larchmont, N. Y., a corporation of New York Application April 20, 1948, Serial No. 22,184

4 Claims. (Cl. 40—115)

Our invention relates to certain new and useful improvements in perpetual calendars and in apparatus for determining the first day of each month of any year, such apparatus being a necessary part of any truly perpetual calendar.

One object of our invention is to provide improved simple and effective means for determining the first day of the monthly calendar for any month of years past, present and future, whether leap years or not. The apparatus is so simplified that it can be used by any one without a knowledge of mathematics, and it makes possible the determination of the first day of all months of an entire year after the apparatus has been set for the selected year. This invention provides a calendar for any date since 1582, the year the Gregorian calendar was adopted, and its information will be accurate so long as the Gregorian calendar remains in force.

This invention comprises essentially three elements in the apparatus for determining the day on which each month begins, and two auxiliary elements for providing a calendar for any selected month. The elements are held in assembled relation and are movable with respect to one another. In the preferred construction, the various elements comprise discs, or portions of discs, held together by a rivet located at a common center axis of the discs, and the information on the various elements is located on annuli of the disc surfaces.

For convenience and ease in operation all leap years are printed in red as are also the month and the day indications that are used in connection with leap years.

Other objects, features and advantages of the invention will appear or be pointed out as the description proceeds.

Figure 2:
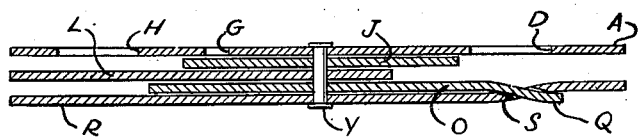
Figure 7:
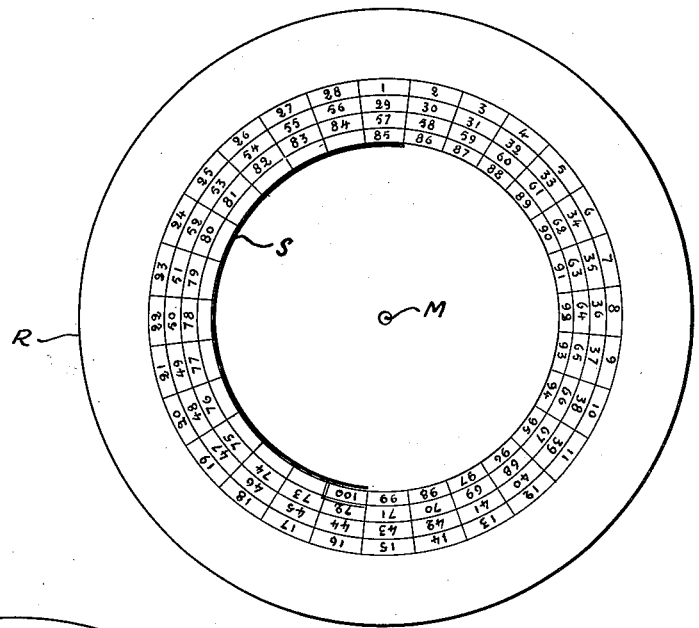
Figure 8:
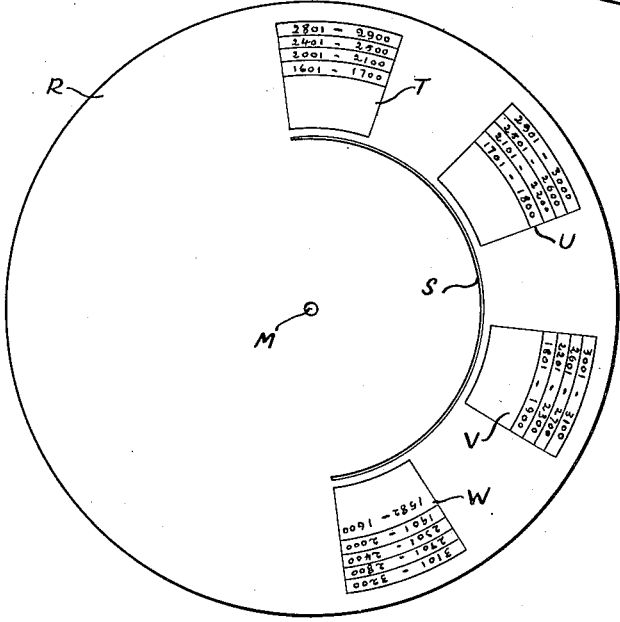

Referring to the drawing which forms a part of the specification,

Figure 1 is a front view of a perpetual calendar made in accordance with this invention, Figure 2 is a sectional view taken on the line 2—2 of the calendar assembly shown in Figure 1, Figure 3 is a view of the cover disc of the calendar shown in Figure 1, Figures 4 to 7 are front views of other elements of the calendar shown in Figure 1, Figure 8 is a back view of the disc shown in Figure 7.

The calendar has a cover A, with a number of windows B, C, D, E, F and G. Legends indicating days of the week are visible through the windows B, C, E and F and through the lower portion of the window D. Numbers representing years of a century are visible through the upper part of the window D. The months of the year are marked on the cover A at different locations along the various windows B—F. Each month being marked at two different locations, except January which is common to both the leap year and the ordinary year groups, and is marked in black.

The names of the months marked on the left-hand side of the windows B and C are used for leap years and are preferably marked in red to distinguish them from the other months marked on the cover. The name of the month on the right-hand side of the window C, and all of the names of the months along the edges of the windows D, E and F are used for ordinary years that are not leap years, and are preferably marked in black.

The aperture or window G is used for exposing the names of the months that are located on an auxiliary disc J (shown in Figure 4) which is used as part of the monthly calendar. There is an opening H, larger than the windows B—G, preferably located near the bottom of the cover and with the days of the week marked along its upper edge. A calendar element L (shown in Figure 5) is movable behind the opening H to bring different columns of numbers under the week day indications provided at the top of the opening to provide a calendar for any month.

Under the cover A there are four elements. The top one is the disc J (Figure 4) with the months of the year marked at equal divisions around a circle. The name of each month is short enough to be exposed through the window G of the cover, and the names of the months are sufficiently far apart so that not more than one name will show through the window G when the name of any particular month is properly centered in this window. It will be apparent that a portion of a disc can be used in place of the full circle shown in Figure 4 provided that the spaces required for the names of the months are properly correlated with the size of the window G. Each of the elements has a center opening M for receiving a rivet Y by which the parts of the calendar are held in assembled relation.

Figure 5 shows an element L which comprises only a portion of a disc. This element L has columns of numbers corresponding to the dates of the month, and these columns are spaced in accordance with the spacing of the day indications at the top of the aperture H (Figure 3) through which the dates on the element L are exposed. The element L is shifted angularly to bring the first day of the month under any desired day of the week. The calendar can be used, therefore, for a month that begins on any day. This type of monthly calendar is well known.

Figure 6 shows a disc O having twenty-eight divisions around its peripheral edge. Each of these divisions has legends representing a day of the week. The days indicated are in consecutive order except that one day is skipped after each group of four successive days, and the fourth day of each group is indicated by red legends for cooperation with the leap year indications of the invention. This cooperation is attained by having the days of the week marked in red fall under leap years showing through window D, which leap years may also be marked in red for easy correlation. All years which are divisible by 4 are by convention called leap years, except a century year which must be divisible by 400 to be considered a leap year. The setting of disc O achieves this relationship as will be seen below. In Figure 6 those days which are marked in red are indicated by underlining the legends on the disc.

There is a tab Q attached to the disc O for moving the disc. This tab Q has the number 100 marked on it in position to cover at certain times a similar number on the face of the rearmost element, disc R (Fig. 7), of the apparatus. The number on the tab Q is marked in red, and it covers the similar number marked in black, to indicate century years that are leap years, as will be more fully understood in connection with the description of the operation of the apparatus. The covering of the black number 100 on disc R is made possible by the construction of disc R whereby the number 100 is separated from the rest of disc R by three slits, one radial and two circumferential or concentric, as shown by the double line about three sides of the number 100 on disc R (Fig. 7). Tab Q (Fig. 6) slides over the black number 100 and red number 100 comes to rest in position directly over black number 100. This occurs only when the tab Q, or indicator Q, is set in the century zone W (Fig. 8).

Figures 7 and 8 show the front and rear faces of the most rearward element of the calendar. This element comprises a disc R on which there are five concentric circles bounding four rows containing twenty-eight equal spaces. These spaces have one hundred numbers on them representing the individual years of a century. Each row of numbers begins with a number twenty-eight years higher than the preceding row because the Gregorian calendar repeats itself every twenty-eight years.

If the invention is to be made for use within only one century, the discs O and R can be permanently attached to each other. In order to make the calendar applicable to any century, we have devised a construction which overcomes the break in the twenty-eight year continuity resulting from the convention of not considering a century year a leap year unless the number of the year is divisible by 400.

This construction comprises a semi-circular slit S in the disc R at a position which permits the tab Q to extend through the slit and across a portion of the back face of the disc R. There are zones T, U, V and W on the back face of the disc R, and these zones contain groups of numbers representing particular centuries.

The tab Q serves as an indicator and it is moved into position to register with the particular zones T, U, V or W that contain the limiting year numbers of the century for which the calendar is to be set. For centuries beyond those indicated on the disc R, the indicator Q is set at the zone in which that century would be included, bearing in mind the fact that each of the four zones T–W is for all centuries having numbers equal to those indicated and others in which multiples of 400 years are added to the century numbers indicated in the respective zones.

When the indicator Q has been set at the proper century zone T–W, the apparatus is turned over and the discs O and R are moved angularly as a unit with respect to the cover A until a selected year of the century is exposed at the window D. The name of the day located immediately under the year number is the day on which the month of January begins for either leap year or ordinary non-leap years. Numbers of leap years are preferably indicated in red on the disc R. If the year is a leap year, the day on which all subsequent months of the year begin are indicated by the days located under the names of the months on the left-hand side of the windows B and C. If the year is not a leap year, the days of the week opposite the month indications on the right-hand side of window C and along the edges of windows D, E, and F are used for setting the first day of the month on the calendar element that is exposed through the opening H.

All of the parts are held in assembled relation by fastening means comprising a rivet Y, and this rivet permits relative angular movement of the parts and serves as guide means for maintaining the parts in their proper relations to the windows and to the other parts during such relative movement.

Illustrations of the method in which our invention functions are furnished by the following. Let us say we wish to determine the calendar settings for the year 1620, the year the Pilgrims landed at Plymouth Rock. We would set the tab Q in zone T which includes the century 1601–1700. This would establish disc O with respect to disc R. We would then rotate them as a unit with respect to the cover A until 20 is exposed at the window D. This number 20, being divisible by 4, is a leap year. The year numbers that appear below, namely 48 and 76, are also divisible by 4 and are also leap years. These numbers would be in red. Furthermore, the day setting in window D would be a red Wednesday, again indicating that the years appearing above it are leap years. From this one setting of our apparatus, we read off the first day of each month automatically: January begins on a Wednesday. From window B, we see that February and August begin on a Saturday; and from window C we see that March and November begin on a Sunday; April and July on Wednesday; May on Friday; June on Monday; September and December on Tuesday; October on Thursday. Furthermore, by setting the month of November through window G and disc L through window H for November 1 to read Sunday, we find that the last Thursday occurred on November 26.

For one year 1787, the year of the adoption of the United States Constitution, we set tab Q in zone U, we rotate discs O and R as a unit with respect to cover A until the black number 87 is exposed at the window D. The first day of each month is then read for August Wednesday in window C, for January and October Monday in window D, and Saturday for December and September, Sunday for July and April in window E, Thursday for February, March and November; and Friday for June in window F.

For the year 1900, a century year not divisible by 400, hence not a leap year, we set tab Q in zone V, and read 1800+100 which equals 1900. The 100 which appears through window D is black indicating that 1900 is not a leap year. The other individual years, 1816, 1844 and 1872 are, however, leap years, hence they appear in red. The first day of each month would be read from the windows B, C and D for them. But for 1900, the first day of each month would be read off from windows C, D, E and F as for the year 1787 discussed above. They would be: Wednesday for August in window C; Monday for January and October in window D; Saturday for September and December, and Monday for April and July in window E; Thursday for February, March and November, and Saturday for June in window F.

For the year 2000, a century leap year, tab Q would be set in zone W and this would give 1900+100 which equals 2000, a red number. The first day of each month would then be:

January, Saturday in window D;
February and August, Tuesday in window B;
March and November, Wednesday in window C;
April and July, Saturday in window C;
May, Monday in window C;
June, Thursday in window C;
September and December, Friday in window C;
October, Sunday in window C.

We have described the preferred embodiment of our invention but do not desire to limit ourselves to the exact descriptions given since the objects of the invention can be accomplished with modified constructions, for example, the elements J and L can be omitted if the invention is to be used merely for setting other perpetual calendars. As previously mentioned, the disc O can be permanently attached to the disc R, if it is desired to make the calendar applicable only to one century and subsequent centuries that have exactly the same calendar. In addition, instead of the circular discs illustrated and described, the invention can be made in the form of a series of concentric tubes which rotate over one another and through the proper location of properly spaced openings give the equivalent determinations of the first days of months in any desired year in any century. Another construction, which is equivalent for some purposes, includes a slide type design with properly located notations of sliders and a base by which with correlated settings the desired information can be obtained.

We claim as our invention:

1. Apparatus for indicating the first day of the month for any year, said apparatus comprising a cover, a first element having a face on which there are 100 numbers representing the individual years of a century, said numbers being in consecutive order in four rows disposed side by side with the first number of each successive row twenty-eight years greater than the first number of the preceding row, a second element having a row of twenty-eight divisions, each with legends representing a day of the week, the days of the week being in consecutive order but skipping one day after each group of four successive days, fastening means holding the cover and the first and second elements in assembled relation and all movable with respect to one another in directions to shift the row of day legends along the rows of year numbers to bring different day legends into position adjacent selected year numbers, groups of numbers representing centuries and located at different zones on the first element, an indicator on the second element in position to register with each century zone when the proper day legend is opposite a corresponding year number, a portion of said cover being open for the exposure of any selected year number for the exposure of day legends for the first day of every month of the selected year and legends on the cover indicating which months of the year begin on the respective days represented by the day legends that are exposed.

2. The apparatus described in claim 1 with the first and second elements comprising discs, and with the rows of numbers and day legends on annuli of the disc surfaces.

3. A perpetual calendar including a cover, a first element having a face on which there are numbers representing the individual years of a century, said numbers being in consecutive order in four rows disposed side by side with the first number of each successive row twenty-eight years greater than the first number of the preceding row, and with the number 4 and all multiples of four that are less than one hundred marked in a different color from the other numbers to indicate leap years, a second element having a row of twenty-eight divisions, each with legends representing a day of the week, the days of the week being in consecutive order but skipping one day after each group of four successive days and having the last day of each group marked in different color for indicating the beginning of a leap year, fastening means holding the cover and the first and second elements in assembled relation and all movable with respect to one another in directions to shift the row of day legends along the rows of year numbers to bring different day legends into position adjacent different year numbers, groups of numbers representing centuries and located at different zones on the side of the first element opposite to the year numbers, an indicator integral with the second element and extending through a slot in the first element adjacent said zones, said indicator being correlated with the day legends on the second element so as to bring predetermined days into position adjacent predetermined year numbers when the indicator is in register with the respective century zones, said indicator having a number 100 of leap year color in position to overlie the number 100 on the first element when said indicator is in position to register with one particular zone of century numbers, said cover having windows through which any selected year number can be exposed and through which day legends for the first day of every month in the selected year are exposed, legends on the cover indicating which month of the year begins on the respective days represented by the day legends that are exposed through the windows, there being different legends for the months of a leap year, said cover having also an opening with the days of the week indicated along one edge of said opening, a calendar element connected to the cover and movable with respect to the cover and having the dates of the month indicated thereon in columns spaced to correspond with the day indications along the edge of said opening, and an additional element connected to the cover and movable with respect to the cover and having the names of all of the months of the year marked thereon, the cover having an aperture through which any one of the names of the months can be exposed.

4. The perpetual calendar described in claim 3 with the first and second element and the additional element comprising discs on which the year numbers, day legends and month names, respectively, are disposed in circles around the discs, and in which the calendar element is a portion of a disc, and in which the fastening means which hold the cover and said elements in assembled relation is a rivet located at a common center of the discs.

SOUREN Z. AVEDIKIAN.
DIRAN G. AVEDIKIAN.

REFERENCES CITED

The following references are of record in the file of this patent:

UNITED STATES PATENTS

| Number | Name | Date |
| --- | --- | --- |
| 846,250 | Sellers et al. | Mar. 5, 1907 |
| 1,214,935 | Lundberg | Feb. 6, 1917 |
| 1,253,562 | Appelbaum | Jan. 15, 1918 |
| 1,494,266 | Mattice | May 13, 1924 |
| 1,541,151 | Khalifah | June 9, 1925 |
| 1,687,743 | Tilden | Oct. 16, 1928 |
| 2,385,732 | Redding | Sept. 25, 1945 |